United States Patent
Dittmer et al.

(10) Patent No.: US 11,051,918 B2
(45) Date of Patent: Jul. 6, 2021

(54) GLASS CERAMIC HAVING A QUARTZ SOLID SOLUTION PHASE

(71) Applicant: Ivoclar Vivadent AG, Schaan (LI)

(72) Inventors: Marc Dittmer, Feldkirch (AT); Wolfram Höland, Schaan (LI); Marcel Schweiger, Chur (CH); Christian Rüssel, Cospeda (DE); Sabrina Seidel, Jena (DE)

(73) Assignee: Ivoclar Vivadent AG, Schaan (LI)

( * ) Notice: Subject to any disclaimer, the term of this patent is extended or adjusted under 35 U.S.C. 154(b) by 1 day.

(21) Appl. No.: 16/524,297

(22) Filed: Jul. 29, 2019

(65) Prior Publication Data

US 2019/0365515 A1 Dec. 5, 2019

Related U.S. Application Data

(62) Division of application No. 15/302,083, filed as application No. PCT/EP2015/056766 on Mar. 27, 2015, now abandoned.

(30) Foreign Application Priority Data

Apr. 7, 2014 (EP) ..................................... 14163680

(51) Int. Cl.
| | |
|---|---|
| *C03C 10/00* | (2006.01) |
| *A61C 13/083* | (2006.01) |
| *C03C 4/00* | (2006.01) |
| *C03C 3/064* | (2006.01) |
| *C03C 3/068* | (2006.01) |
| *C03C 3/062* | (2006.01) |
| *C03C 3/091* | (2006.01) |
| *C03C 3/093* | (2006.01) |
| *C03C 3/085* | (2006.01) |
| *C03B 32/02* | (2006.01) |
| *A61C 5/77* | (2017.01) |
| *A61C 8/00* | (2006.01) |
| *A61C 13/00* | (2006.01) |

(52) U.S. Cl.
CPC .............. *A61C 13/083* (2013.01); *A61C 5/77* (2017.02); *A61C 8/0012* (2013.01); *A61C 8/0048* (2013.01); *A61C 13/0006* (2013.01); *A61C 13/0022* (2013.01); *C03B 32/02* (2013.01); *C03C 3/062* (2013.01); *C03C 3/064* (2013.01); *C03C 3/068* (2013.01); *C03C 3/085* (2013.01); *C03C 3/091* (2013.01); *C03C 3/093* (2013.01); *C03C 4/0021* (2013.01); *C03C 10/0009* (2013.01); *C03C 10/0045* (2013.01); *C03C 2204/00* (2013.01)

(58) Field of Classification Search
CPC . C03C 10/00; C03C 10/0009; C03C 10/0036; C03C 10/0045

See application file for complete search history.

(56) References Cited

U.S. PATENT DOCUMENTS

| | | | | |
|---|---|---|---|---|
| 3,205,079 | A | * 9/1965 | Stookey .............. | C03C 10/0045 501/4 |
| 3,524,748 | A ‡ | 8/1970 | Beall ................... | C03C 10/0045 501/4 |
| 3,873,329 | A ‡ | 3/1975 | Beall ...................... | C03B 32/02 501/4 |
| 6,627,565 | B1 ‡ | 9/2003 | Zou ..................... | C03C 10/0045 428/84 |
| 2008/0269038 | A1 | 10/2008 | Schneider et al. | |
| 2012/0241991 | A1 ‡ | 9/2012 | Ritzberger ........... | A61K 6/0094 264/19 |

FOREIGN PATENT DOCUMENTS

| | | | |
|---|---|---|---|
| DE | 2507131 A1 | ‡ | 9/1975 |
| DE | 2507131 A1 | | 9/1975 |
| GB | 2172282 A | ‡ | 9/1986 |
| GB | 2172282 A | | 9/1986 |
| JP | 2000063144 A | ‡ | 2/2000 |
| JP | 2000063144 A | | 2/2000 |

OTHER PUBLICATIONS

Dittmer et al. Colorless and high strength MgO/Al2O3/SiO2 glass-ceramic dental material using zirconia as nucleating agent. J Biomed Mater Res Part B 2012:100B:463-470.*

Cherdtham et al. Li2O—MgO—B2O3—Al2O3—SiO2 Glass-Ceramic for Dental Veneering Application. Suranaree J. Sci. Technol. 21(2):97-103.*

Dittmer, Marc et al., "Self-organized nanocrystallinity in MgO—Al2O3—SiO2 glasses with ZrO2 as nucleating agent," Journal of Materials Chemistry and Physics 124 (2010) 1083-1088.‡

Dittmer, Marc et al., "Crystallization and mechanical properties of MgO/Al2O3/SiO2/ZrO2 glass-ceramics with and without the addition of yttria," Journal of Solid State Sciences 13 (2011) 2146-2153.‡

Dittmer, Marc et al., "Colorless and high strength MgO/Al2O3.SiO2 glass-ceramic dental material using zirconia as nucleating agent," Journal of Biomed Mater Res, Part B 2012: 100B: 463-470.‡

Dittmer, Marc, "Glasses and glass-ceramics in the system of MgO—Al2O3-SiO2 with ZrO2 as nucleating agent," Dissertation, 2011, University of Jena (Germany).‡

Drummond III, Charles H., "Glass Formation and Crystallization in High-Temperature Glass-Ceramics and Si3N4," Journal of Non-Crystalline Solids 123 (1990) 114-128.‡

International Preliminary Report on Patentability of PCT/EP2015/056766, dated Oct. 12, 2016, 10 pages.‡

Rossel, Christian et al., "Dental prosthesis made of high-stress glass ceramics," GIT-Labor—Portal for users in science and industry, Mar. 12, 2012, University of Jena, Germany.‡

Dittmer, Marc et al., "Self-organized nanocrystallinity in MgO—Al2O3—SiO2 glasses with ZrO2 as nucleating agent," Journal of Materials Chemistry and Physics 124 (2010) 1083-1088.

(Continued)

Primary Examiner — Noah S Wiese

(74) Attorney, Agent, or Firm — Ann M. Knab; Thad McMurray

(57) ABSTRACT

Quartz solid solution glass ceramics and precursors thereof are described, which are characterized by very good mechanical and optical properties and in particular can be used as restoration material in dentistry.

21 Claims, No Drawings

(56) References Cited

OTHER PUBLICATIONS

Dittmer, Marc et al., "Crystallization and mechanical properties of MgO/Al2O3/SiO2/ZrO2 glass-ceramics with and without the addition of yttria," Journal of Solid State Sciences 13 (2011) 2146-2153.
Dittmer, Marc et al., "Colorless and high strength MgO/Al2O3. SiO2 glass-ceramic dental material using zirconia as nucleating agent," Journal of Biomed Mater Res, Part B 2012: 100B: 463-470.
Dittmer, Marc et al., "Glasses and glass-ceramics in the system of MgO—Al2O3—SiO2 with ZrO2 as nucleating agent," Dissertation, 2011, University of Jena (Germany).
Rüssel, Christian et al., "Dental prosthesis made of high-stress glass ceramics," GIT-Labor—Portal for users in science and industry, Mar. 12, 2012, University of Jena, Germany.

\* cited by examiner
‡ imported from a related application

GLASS CERAMIC HAVING A QUARTZ SOLID SOLUTION PHASE

CROSS-REFERENCE TO RELATED APPLICATIONS

This application claims priority to and is a divisional application of U.S. application Ser. No. 15/302,083, filed Oct. 5, 2016, which is the National Stage application of International patent application PCT/EP2015/056766 filed on Mar. 27, 2015, which claims priority to European patent application No. 14163680.3 filed on Apr. 7, 2014, the disclosures of which are incorporated herein by reference in their entirety.

TECHNICAL FIELD

The invention relates to glass ceramic having a quartz solid solution phase, which is suitable in particular for use in dentistry and preferably for preparing dental restorations, as well as to precursors for the preparation of the glass ceramic.

Glass ceramics having a quartz solid solution phase are known from the state of the art.

DE 25 07 131 describes specific magnesium aluminosilicate glass ceramics having a $ZrO_2$ content of from 4 to 10 wt.-%. Bodies produced from the glass ceramics have a heterogeneous structure in that the crystal structure of the surface layer differs from that of the inside of the body. The surface compressive stress produced in this way has a substantial influence on the mechanical properties, with the result that machining of the surface layer results in the mechanical properties being impaired. High-quartz solid solutions could be detected in the surface layer and low-quartz solid solutions could be detected inside the body.

JP 2000/063144 discloses magnesium aluminosilicate glasses for preparing substrates for recording media, which have low amounts of from 0 to 10 mol.-% of $ZrO_2$ and large amounts of $B_2O_3$.

GB 2 172 282 A describes magnesium aluminosilicate glass ceramics, which can contain a maximum of 13.0 wt.-% $ZrO_2$ in view of the solubility limit. The glass ceramics are provided for microelectronic applications and in particular as coating for substrates such as e.g. aluminum and, in addition to high strength, they have a suitable dielectric constant in the range of from 7 to 10 as well as a high electrical resistance.

In M. Dittmer's doctoral thesis "Gläser and Glaskeramiken im System MgO—$Al_2O_3$—$SiO_2$ mit $ZrO_2$ als Keimbildner" [Glasses and glass ceramics in the MgO—$Al_2O_3$—$SiO_2$ system with $ZrO_2$ as nucleating agent], University of Jena 2011, it was found that the solubility limit of $ZrO_2$ in the MgO—$Al_2O_3$—$SiO_2$ glass ceramics described is 12.7 wt.-%.

In the article by M. Dittmer and C. Rüssel in J. Biomed. Mater. Res. Part B:100B:463-470 (2012) glass ceramics with high-quartz or low-quartz solid solution phase as main crystal phase are described which contain a maximum of 12.5 wt.-% $ZrO_2$. It was shown that increasing the $ZrO_2$ content from 10.2 to 12.5 wt.-% $ZrO_2$ usually leads to a reduction in the bending strength irrespective of the temperature at which the glass ceramics are formed from the corresponding starting glasses. As a whole, the strengths achieved with these glass ceramics and also the translucence are not completely satisfactory for use as dental material.

SUMMARY

The object of the invention is therefore to provide a glass ceramic which shows a combination of high strength and good translucence. The glass ceramic should further be easy to be processed into dental restorations and thus be excellently suitable as restorative dental material.

DETAILED DESCRIPTION

This object is achieved by the glass ceramic having a quartz solid solution phase according to claims 1 to 11 and 14. Also a subject-matter of the invention are the starting glass according to claims 12 to 14, the process according to claims 15 to 18 as well as the use according to claims 19 to 21.

The glass ceramic having a quartz solid solution phase according to the invention is characterized in that it comprises the following components

| Component | wt.-% |
|---|---|
| $SiO_2$ | 37.0 to 50.0 |
| $Al_2O_3$ | 25.0 to 39.0 |
| MgO | 5.0 to 15.0 |
| $ZrO_2$ | 13.5 to 19.0 |

This glass ceramic, also called "quartz solid solution glass ceramic" in the following, surprisingly shows an advantageous combination of mechanical and optical properties which are desirable for a restorative dental material. It is additionally surprising that the indicated high amounts of $ZrO_2$ can be incorporated into it.

By the term "quartz solid solution phase" is meant a crystal phase of $SiO_2$, in which in the $SiO_2$ lattice foreign ions or foreign atoms are incorporated either into interstitial lattice sites or into lattice sites. These foreign ions or foreign atoms can in particular be Al as well as Mg, Li and/or Zn. Al can be present in the solid solution in the same molar concentration as Zn and Mg together.

The quartz solid solution glass ceramic according to the invention comprises in particular 38.0 to 49.0 wt.-% and preferably 38.5 to 48.0 wt.-% $SiO_2$.

It is further preferred that the glass ceramic comprises 26.0 to 38.0 and in particular 27.0 to 37.0 wt.-% $Al_2O_3$.

A glass ceramic that comprises 6.0 to 14.0 and in particular 7.0 to 13.5 wt.-% MgO is also preferred.

Further, a glass ceramic is preferred that comprises 14.0 to 18.0 wt.-% $ZrO_2$.

In a preferred embodiment, the glass ceramic according to the invention comprises at least one and preferably all of the following components in the indicated amounts:

| Component | wt.-% |
|---|---|
| $SiO_2$ | 37.0 to 50.0 |
| $Al_2O_3$ | 25.0 to 39.0 |
| MgO | 5.0 to 15.0 |
| $ZrO_2$ | 13.5 to 19.0 |
| $Li_2O$ | 0 to 1.0 |
| $Na_2O$ | 0 to 1.0 |
| $K_2O$ | 0 to 1.0 |
| CaO | 0 to 2.5 |
| SrO | 0 to 4.0 |
| ZnO | 0 to 15.0, in particular 0 to 8.0 |
| $B_2O_3$ | 0 to 1.0. |

It is further preferred that the glass ceramic comprises the divalent oxides CaO, SrO, MgO and ZnO, as well as mixtures thereof, in an amount of from 5.0 to 20.0 wt.-%.

The glass ceramic according to the invention can also comprise further additional components which in particular are selected from colorants and fluorescent agents. Examples of colorants are oxides of d- and f-elements, such as e.g. $CeO_2$.

It is further preferred that the glass ceramic according to the invention comprises the quartz solid solution phase as main crystal phase.

The term "main crystal phase" denotes the crystal phase which has the highest percentage by weight of all the crystal phases present in the glass ceramic. The amounts of the crystal phases are in particular determined using the Rietveld method. A suitable method for the quantitative analysis of the crystal phases using the Rietveld method is described e.g. in M. Dittmer's doctoral thesis "Gläser and Glaskeramiken im System MgO—$Al_2O_3$—$SiO_2$ mit $ZrO_2$ als Keimbildner" [Glasses and glass ceramics in the MgO—$Al_2O_3$—$SiO_2$ system with $ZrO_2$ as nucleating agent], University of Jena 2011.

The glass ceramic according to the invention preferably also comprises zirconium oxide, in particular tetragonal zirconium oxide, and/or $MgAl_2O_4$ as crystal phase.

Further crystal phases, such as in particular Indialite/Cordierite, Sapphirine, Mullite or Cristobalite are also possible.

The quartz solid solution phase present in the glass ceramic according to the invention is usually formed by a high-quartz solid solution phase, a low-quartz solid solution phase or a mixture of these crystal phases.

Therefore, in an embodiment, the glass ceramic according to the invention comprises high-quartz solid solution phase, low-quartz solid solution phase or a mixture of these.

In a preferred embodiment, the glass ceramic comprises high-quartz solid solution phase in a higher amount than low-quartz solid solution phase and in particular the glass ceramic comprises high-quartz solid solution phase as main crystal phase. The glass ceramic of this embodiment is in the following also referred to as "high-quartz solid solution glass ceramic".

In another preferred embodiment, the glass ceramic comprises low-quartz solid solution phase in a higher amount than high-quartz solid solution phase and in particular the glass ceramic comprises low-quartz solid solution phase as main crystal phase. The glass ceramic of this embodiment is in the following also referred to as "low-quartz solid solution glass ceramic".

The low-quartz solid solution glass ceramic according to the invention is characterized by particularly good mechanical properties and optical properties and it can be formed by heat treatment of a corresponding starting glass, a corresponding starting glass with nuclei or a corresponding high-quartz solid solution glass ceramic. These materials can therefore serve as precursors for the low-quartz solid solution glass ceramic according to the invention.

The low-quartz solid solution glass ceramic according to the invention has a fracture toughness, measured as $K_{IC}$ value, of in particular at least about 1.5, preferably at least about 1.7 and particularly preferred at least about 1.9 $MPa \cdot m^{0.5}$. This value was determined using the Vickers method and calculated using the Evans-Charles equation.

Further, the low-quartz solid solution glass ceramic according to the invention has a high biaxial breaking strength of in particular at least 350 MPa and preferably at least 500 MPa and up to in particular 800 and preferably up to 1000 MPa. The biaxial breaking strength was determined according to ISO 6872 (2008).

In contrast to this, the high-quartz solid solution glass ceramic according to the invention is characterized in particular by mechanical properties which allow particularly easy and quick machining to give the glass ceramic the shape of e.g. a dental restoration.

The invention also relates to precursors with the corresponding composition, from which the quartz solid solution glass ceramic according to the invention, in particular the high-quartz solid solution glass ceramic according to the invention or the low-quartz solid solution glass ceramic according to the invention can be prepared by heat treatment. These precursors are a starting glass with corresponding composition and a starting glass with nuclei with corresponding composition. The term "corresponding composition" means that these precursors comprise the same components in the same amounts as the glass ceramic, with the components, apart from fluorine, being calculated as oxides as is customary for glasses and glass ceramics.

The invention, therefore, also relates to a starting glass which comprises the components of the quartz solid solution glass ceramic according to the invention.

The starting glass according to the invention therefore comprises as components

| Component | wt.-% |
|---|---|
| $SiO_2$ | 37.0 to 50.0 |
| $Al_2O_3$ | 25.0 to 39.0 |
| MgO | 5.0 to 15.0 |
| $ZrO_2$ | 13.5 to 19.0. |

Moreover, the starting glass can also comprises still further components, such as are indicated above for the quartz solid solution glass ceramic according to the invention. All those embodiments which are indicated as being preferred for the components of the quartz solid solution glass ceramic according to the invention are also preferred for the components of the starting glass.

The invention also relates to such a starting glass which comprises nuclei for the crystallization of quartz solid solution phase.

By heat treatment of the starting glass, first of all the starting glass with nuclei can be produced, which can then be converted into the quartz solid solution glass ceramic by further heat treatment. The high-quartz solid solution glass ceramic can be produced first of all by the heat treatment of the starting glass or of the starting glass comprising nuclei and the high-quartz solid solution glass ceramic can be converted into the low-quartz solid solution glass ceramic by further heat treatment. It is also possible to form the low-quartz solid solution glass ceramic directly by heat treatment of the starting glass or of the starting glass comprising nuclei.

The preparation of the starting glass is carried out in particular in such a way that a mixture of suitable starting materials, such as carbonates and oxides, is melted at temperatures of in particular about 1500 to 1700° C. for 0.5 to 4 h. To achieve a particularly high homogeneity, the glass melt obtained can be poured into water in order to form a glass frit, and the frit obtained is then melted again.

The melt can then be poured into moulds, e.g. steel or graphite moulds, in order to produce blanks of the starting glass, so-called solid glass blanks or monolithic blanks. These monolithic blanks are usually stress-relieved first of all, e.g. by keeping them at 750 to 850° C. for 5 to 30 min and then slowly cooling them to room temperature.

It is also possible to put the melt into water again in order to prepare a frit. This frit can be pressed, after grinding and, optionally, addition of further components, such as colorants and fluorescent agents, to form a blank, a so-called powder green compact.

Finally, the starting glass can also be processed to form a powder.

The starting glass with nuclei can then be produced from the starting glass by heat treatment. This is also called nucleation process.

The invention is therefore also directed to a process for preparing the starting glass comprising nuclei for the crystallization of quartz solid solution phase, wherein
(a) the starting glass is subjected to a heat treatment at a temperature of from 750 to 870° C. and in particular 770 to 850° C. for a period of in particular 5 to 120 min and preferably 5 to 60 min.

The quartz solid solution glass ceramic according to the invention can then be formed from the starting glass with nuclei by heat treatment.

The invention is therefore also directed to a process for preparing the quartz solid solution glass ceramic, in which the starting glass, in particular the starting glass comprising nuclei for the crystallization of quartz solid solution phase, is subjected to at least one heat treatment at a temperature of from 850 to 1200° C.

The starting glass or the starting glass comprising nuclei can be subjected to the at least one heat treatment e.g. in the form of a solid glass blank, a powder green compact or in the form of a powder.

The at least one heat treatment carried out in the process according to the invention can also take place during a sintering-on.

The high-quartz solid solution glass ceramic according to the invention and the low-quartz solid solution glass ceramic according to the invention are preferably prepared by means of specific heat treatments as are indicated in the following.

In a particular embodiment, the invention is therefore directed to a process in which
(b) the starting glass or the starting glass comprising nuclei for the crystallization of quartz solid solution phase is subjected to a heat treatment at a temperature of from 850 to 1000° C. and in particular 890 to 980° C. for a period of in particular 20 to 600 min, preferably 30 to 180 min and particularly preferred 30 to 90 min, to form the high-quartz solid solution glass ceramic according to the invention.

In a further particular embodiment, the invention is therefore directed to a process in which
(c) the starting glass, the starting glass comprising nuclei for the crystallization of quartz solid solution phase or the high-quartz solid solution glass ceramic is subjected to a heat treatment at a temperature of from 1000 to 1200° C. and in particular 1050 to 1150° C. for a period of in particular 10 to 240 min and preferably 30 to 200 min, to form the low-quartz solid solution glass ceramic according to the invention.

By means of the above described nucleation and controlled crystallization of the starting glass, the high-quartz solid solution glass ceramic according to the invention or the low-quartz solid solution glass ceramic according to the invention can be formed, depending on the composition of the starting glass and on the heat treatment chosen for the controlled crystallization.

It is assumed that the quartz solid solution phase of the glass ceramic according to the invention is produced by incorporating foreign ions in the $SiO_2$ lattice and possibly replacing two Si ions with two Al ions and one Mg ion. It is further assumed that, by crystallizing the starting glasses at lower temperatures, in particular 850 to 1000° C., the high-temperature modification of the quartz is preferably formed and that this modification is stable also at room temperature due to the incorporation of the foreign ions and does not convert to the low-temperature modification, as would be the case with pure quartz. Moreover, it is assumed that crystallization at higher temperatures, in particular 1000 to 1200° C., results in the quartz solid solution phase having fewer foreign ions and thus the high-temperature modification being less stable, whereby at room temperature the low-temperature modification of the quartz is present.

The glass ceramics according to the invention and the glasses according to the invention are present in particular as powder or blanks in any shape and size, e.g. monolithic blanks, such as platelets, cuboids or cylinders, or powder green compacts. They can easily be further processed in these forms, e.g. to form dental restorations. They can, however, also be present in the form of dental restorations, such as inlays, onlays, crowns, veneers, facets or abutments.

Dental restorations, such as bridges, inlays, onlays, crowns, veneers, facets or abutments, can be prepared from the glass ceramics according to the invention and the glasses according to the invention. The invention therefore also relates to their use as dental material and in particular to their use for preparing dental restorations. It is preferred that the glass ceramic or the glass is given, by machining, the shape of the desired dental restoration.

The machining usually takes place by material removal processes and in particular by milling and/or grinding. It is particularly preferred that the machining is carried out as part of a CAD/CAM process. The starting glass according to the invention, the starting glass comprising nuclei according to the invention as well as the quartz solid solution glass ceramic according to the invention can be used for the machining. The glasses and glass ceramics according to the invention are in particular used in the form of blanks, preferably solid blanks. The high-quartz solid solution glass ceramic according to the invention is preferably used for the machining. The quartz solid solution glass ceramic according to the invention can also be used in a not yet fully crystallized form which was produced by heat treatment at a lower temperature. This has the advantage that an easier machining and thus the use of simpler equipment for the machining is possible. After the machining of such a partly-crystallized material, it is usually subjected to a further heat treatment in order to effect a further crystallization of quartz solid solution phase.

In general, after preparing the dental restoration shaped as desired, e.g. by machining, it can in particular be heat-treated again in order to convert precursors used, such as starting glass, starting glass comprising nuclei or high-quartz solid solution glass ceramic, into low-quartz solid solution glass ceramic or to increase the crystallization of low-quartz solid solution phase.

However, the glass ceramics according to the invention and the glasses according to the invention are also suitable as coating material of e.g. ceramics and glass ceramics. The invention is, therefore, also directed to the use of the glasses according to the invention or the glass ceramics according to the invention for coating in particular ceramics and glass ceramics.

The invention also relates to a process for coating ceramics and glass ceramics, in which glass ceramics according to the invention or glasses according to the invention are applied to the ceramic or glass ceramic and are exposed to a temperature of at least 950° C.

This can in particular take place by sintering-on. During sintering-on, the glass ceramic or the glass is applied to the material to be coated, such as ceramic or glass ceramic, in the usual way, e.g. as powder, and then sintered.

It is preferred that the low-quartz solid solution glass ceramic according to the invention is present after the coating process has finished, as such a glass ceramic has particularly good mechanical and optical properties.

Because of the above-described properties of the glass ceramics according to the invention and the glasses according to the invention, these are suitable in particular for use in dentistry. A subject-matter of the invention is therefore also the use of the glass ceramics according to the invention or the glasses according to the invention as dental material and in particular for preparing dental restorations or as coating material for dental restorations, such as crowns, bridges and abutments.

The invention is described in more detail below with reference to non-limiting examples.

EXAMPLES

Examples 1 to 14

Composition and Crystal Phases

A total of 14 glasses and glass ceramics according to the invention with the composition indicated in Table I were prepared by melting corresponding starting glasses followed by heat treatment for controlled nucleation and crystallization.

The heat treatments used for controlled nucleation and controlled crystallization are also indicated in Table I. The following meanings apply $T_N$ and $t_N$ Temperature and time used for nucleation
$T_C$ and $t_C$ Temperature and time used for crystallization of high-quartz solid solution glass ceramic
$T_{FC}$ and $t_{FC}$ Temperature and time used for crystallization of low-quartz solid solution glass ceramic First, the starting glasses were melted in a batch size of 100 to 200 g from customary raw materials at 1500 to 1700° C., wherein the melting was very easily possible without formation of bubbles or streaks. By pouring the molten starting glasses into water, glass frits were produced which were then melted a second time at 1500 to 1700° C. for 0.5 to 4 h for homogenization.

The melts of the starting glasses were poured into graphite or steel moulds to produce glass monoliths. These glass monoliths were stress-relieved and slowly cooled to room temperature.

A first heat treatment of the starting glasses at a temperature of from 780 to 840° C. led to the formation of starting glasses comprising nuclei for the crystallization of quartz solid solution phase.

As a result of a further heat treatment at 1100 to 1130° C., these nuclei-containing starting glasses crystallized to form low-quartz solid solution glass ceramics according to the invention which comprised low-quartz solid solution phase as main crystal phase, as was established by X-ray diffraction experiments at room temperature.

In the case of examples 7 and 8, the heat treatment of the nuclei-containing starting glass led, at a temperature of only 895° C. and 950° C., respectively, to the crystallization of high-quartz solid solution glass ceramic. This high-quartz solid solution glass ceramic was converted into the corresponding low-quartz solid solution glass ceramic by a further heat treatment at 1130 and 1100° C., respectively.

The glasses, glasses comprising nuclei and high-quartz solid solution glass ceramics produced as precursors were able to be very satisfactorily machined into the form of various dental restorations in a CAD/CAM process, which restorations were also provided with a veneer if required.

Various properties of the low-quartz solid solution glass ceramics according to the invention which were produced are also listed in Table I. These properties were determined in the way indicated in the following detailed examples.

In the following, some examples are described in more detail.

Example 1

The glass with the composition according to example 1 was melted from corresponding raw materials at a temperature of 1650° C. for 2 h and then converted into a glass frit by pouring into water. After drying in a drying furnace, the glass frit was melted again at 1650° C. for 2 h and then poured into graphite moulds to produce glass monoliths. Immediately after removing the hot glass monoliths from the mould they were stress-relieved for 10 min at 810° C. and then slowly cooled to room temperature.

Corresponding holders were adhesively bonded to the glass blocks obtained to enable CAM processing by Sirona inLab grinders. The grinding was carried out using diamond-coated grinding tools. Platelets with a diameter of about 12 mm and a thickness of about 2 mm were ground out of the blocks.

The ground platelets were converted into the low-quartz solid solution glass ceramic using a thermal treatment. The platelets were heated to a temperature of 1100° C. in a muffle kiln from the company Nabertherm and, after a holding time of 180 min, slowly cooled to room temperature.

Some of the platelets were ground with diamond grinding discs to a thickness of about 1.2 mm and polished to 0.5 μm before crystallization of the low-quartz solid solution phase, i.e. in the glass state or high-quartz solid solution state, and others after crystallization of the low-quartz solid solution phase. The biaxial strength of the samples produced and prepared in this way was then determined according to ISO 6872 (2008). Average strengths of 257 MPa were obtained for samples processed afterwards and average strengths of 849 MPa were obtained for samples processed before the crystallization.

The CR value was determined according to British Standard BS 5612 using a CM-3700d spectrometer (Konica-Minolta) and resulted in a value of 82.5. Additionally, the CR value of the glass ceramic C was determined in the same way, which glass ceramic is described in the article by M. Dittmer and C. Rüssel in J. Biomed. Mater. Res. Part B:100B:463-470 (2012). The CR value of this glass ceramic was 97.7%.

The Vickers hardness and the fracture toughness $K_{Ic}$ were determined on platelets with approximate dimensions of 13 mm×12 mm. After the crystallization, the samples were ground to a thickness of about 2 mm and polished to 0.5 μm. 6 indentations were then carried out on each sample with a load period of 30 s, a load of 2.5 kg and a force F of 24.54 N, respectively. The crack lengths after the indentation were then determined from the corner of the indentation to the tip of the crack. The following values were determined:
Vickers hardness: 10.4 GPa
Fracture toughness $K_{IC}$: 1.90 MPa·m$^{1/2}$ Example 4

The glass with the composition according to example 4 was melted from corresponding raw materials at a temperature of 1600° C. for 30 min and 1610° C. for 30 min and then converted into a glass frit by pouring into water. After drying in a drying furnace, the glass frit was melted again at 1630° C. for 1 h and then poured into graphite moulds to produce glass monoliths. Immediately after removing the hot glass monoliths from the mould these were stress-relieved for 10 min at 820° C. and then slowly cooled to room temperature.

Corresponding holders were adhesively bonded to the glass blocks obtained to enable CAM processing by Sirona inLab grinders. The grinding was carried out using diamond-coated grinding tools. Platelets with a diameter of about 12 mm and a thickness of about 2 mm were ground out of the blocks.

The ground platelets were converted into the low-quartz solid solution glass ceramic via a thermal treatment. The platelets were heated to a temperature of 1100° C. in a muffle kiln from the company Nabertherm and, after a holding time of 180 min, slowly cooled to room temperature.

Some of the platelets were ground with diamond grinding discs to a thickness of about 1.2 mm and polished to 0.5 μm before crystallization of the low-quartz solid solution phase, i.e. in the glass state or high-quartz solid solution state, and others after crystallization of the low-quartz solid solution phase. The biaxial strength of the samples produced and prepared in this way was then determined according to ISO 6872 (2008). Average strengths of 393 MPa were obtained for samples processed afterwards and average strengths of 825 MPa were obtained for samples processed before the crystallization.

The CR value was determined according to British Standard BS 5612 using a CM-3700d spectrometer (Konica-Minolta) and gave a value of 63.0.

The Vickers hardness and the fracture toughness $K_{Ic}$ were determined on platelets with approximate dimensions of 13 mm×12 mm. After the crystallization, the samples were ground to a thickness of about 2 mm and polished to 0.5 μm. 6 indentations were then carried out on each sample with a load period of 30 s, a load of 2.5 kg and a force F of 24.54 N, respectively. The crack lengths after the indentation were then determined from the corner of the indentation to the tip of the crack. The following values could be achieved:

Vickers hardness: 10.3 GPa
Fracture toughness $K_{IC}$: 2.3 MPa·m$^{1,2}$

Example 8

The glass with the composition according to example 8 was melted from corresponding raw materials at a temperature of 1650° C. for 1 h and then converted into a glass frit by pouring into water. After drying in a drying furnace, the glass frit was melted again at 1650° C. for 1 h and then poured into graphite moulds to produce glass monoliths. Immediately after removing the hot glass monoliths from the mould, these were stress-relieved for 10 min at 800° C. and then slowly cooled to room temperature.

After the blocks had cooled to room temperature, they were heated to a temperature of 950° C. in a Programat-type furnace (Ivoclar Vivadent AG) and kept at that temperature for 60 min, to form the high-quartz solid solution phase.

Corresponding holders were adhesively bonded to the glass ceramic blocks obtained to enable CAM processing by Sirona inLab grinders. The grinding was carried out using diamond-coated grinding tools. Platelets with a diameter of about 12 mm and a thickness of about 2 mm were ground out of the blocks.

The ground platelets were converted into the low-quartz solid solution glass ceramic via a thermal treatment. The platelets were heated to a temperature of 1100° C. in a Programat-type furnace (Ivoclar Vivadent AG) and, after a holding time of 60 min, slowly cooled to room temperature.

The platelets were then ground to a thickness of about 1.2 mm with diamond grinding discs and polished to 0.5 μm. The biaxial strength of the samples produced and prepared in this way was then determined according to ISO 6872 (2008). Average strengths of 227 MPa were established.

The CR value was determined according to British Standard BS 5612 using a CM-3700d spectrometer (Konica-Minolta) and resulted in a value of 85.3.

In Table I below, the following meanings apply:
high-quartz solid solution: high-quartz solid solution phase
low-quartz solid solution: low-quartz solid solution phase
t-$ZrO_2$: tetragonal $ZrO_2$
$MgAl_2O_4$: Spinel

TABLE I

| Composition | 1 wt. % | 2 wt. % | 3 wt. % | 4 wt. % | 5 wt. % | 6 wt. % | 7 wt. % |
|---|---|---|---|---|---|---|---|
| $SiO_2$ | 43.4 | 42.7 | 39.2 | 41.1 | 38.5 | 43.2 | 43.2 |
| $Al_2O_3$ | 30.1 | 29.7 | 33.2 | 34.0 | 36.6 | 30 | 30.0 |
| MgO | 11.9 | 11.7 | 13.1 | 10.7 | 9.6 | 11.9 | 11.9 |
| ZnO | — | — | — | — | — | — | — |
| $ZrO_2$ | 14.6 | 15.9 | 14.5 | 14.2 | 15.3 | 14.5 | 14.5 |
| $Li_2O$ | — | — | — | — | — | 0.4 | — |
| $Na_2O$ | — | — | — | — | — | — | 0.4 |
| $K_2O$ | — | — | — | — | — | — | — |
| CaO | — | — | — | — | — | — | — |
| $B_2O_3$ | — | — | — | — | — | — | — |
| $T_g$/° C. | 805 | 818 | 804 | 810 | 816 | 781 | 800 |
| $T_N$/° C., $t_N$/min | 810, 10 | 820, 10 | 810, 10 | 820, 10 | 840, 10 | 780, 10 | 800, 10 |
| $T_C$/° C., $t_C$/min | — | — | — | — | — | — | 895, 60 |
| Main crystal phase RT-XRD | — | — | — | — | — | — | high-quartz solid solution |
| Further crystal phases | — | — | — | — | — | — | t-$ZrO_2$ |

TABLE I-continued

| | | | | | | | |
|---|---|---|---|---|---|---|---|
| $T_{FC}/°C$, $t_{FC}$/min | 1100, 180 | 1100, 180 | 1100, 180 | 1100, 180 | 1100, 180 | 1100, 180 | 1130, 180 |
| Main crystal phase RT-XRD | low-quartz solid solution | low-quartz solid solution | low-quartz solid solution | low-quartz solid solution, | low-quartz solid solution, t-ZrO$_2$ | low-quartz solid solution t-ZrO$_2$ | low-quartz solid solution |
| Further crystal phases | t-ZrO$_2$, MgAl$_2$O$_4$ | t-ZrO$_2$, MgAl$_2$O$_4$ | t-ZrO$_2$, MgAl$_2$O$_4$ | MgAl$_2$O$_4$ | MgAl$_2$O$_4$, Mullite | t-ZrO$_2$, MgAl$_2$O$_4$, Indialite | t-ZrO$_2$, MgAl$_2$O$_4$, Indialite |
| CR value | 82.5 | 80.0 | 81.4 | 63.0 | 80.9 | 80.8 | 81.1 |
| Vickers hardness/GPa | 10.4 | — | 10.4 | 10.3 | — | — | — |
| $K_{IC}$/MPa m$^{1/2}$ | 1.90 | — | 2.4 | 2.3 | — | — | — |
| $\sigma_B$/MPa (processed after crystallization) | 257 | — | 360 | 393 | — | 335 | 267 |
| $\sigma_B$/MPa (processed before crystallization) | 849 | — | 785 | 825 | — | 513 | 635 |

| Composition | 8 wt. % | 9 wt. % | 10 wt. % | 11 wt. % | 12 wt. % | 13 wt. % | 14 wt. % |
|---|---|---|---|---|---|---|---|
| SiO$_2$ | 43.2 | 41.7 | 42.6 | 41.5 | 42.8 | 40.5 | 48.0 |
| Al$_2$O$_3$ | 29.9 | 32.1 | 29.7 | 28.9 | 29.7 | 31.6 | 27.2 |
| MgO | 11.8 | 11.1 | 10.3 | 7.6 | 10.3 | 10.4 | 10.7 |
| ZnO | — | — | 3 | 7.7 | — | — | — |
| ZrO$_2$ | 14.5 | 14.2 | 14.4 | 14.3 | 15.2 | 17.1 | 14.1 |
| Li$_2$O | — | — | — | — | — | 0.4 | — |
| Na$_2$O | — | — | — | — | — | — | — |
| K$_2$O | 0.6 | — | — | — | — | — | — |
| CaO | — | — | — | — | 2.0 | — | — |
| B$_2$O$_3$ | — | 0.9 | — | — | — | — | — |
| $T_g/°C$ | 796 | 791 | 796 | 781 | 801 | 788 | 810 |
| $T_N/°C$, $t_N$/min | 800, 10 | 800, 10 | 820, 10 | 800, 10 | 820, 10 | 810, 10 | 820, 10 |
| $T_C/°C$, $t_C$/min | 950, 60 | — | — | — | — | — | — |
| Main crystal phase RT-XRD | high-quartz solid solution | — | — | — | — | — | — |
| Further crystal phases | t-ZrO$_2$ | — | — | — | — | — | — |
| $T_{FC}/°C$, $t_{FC}$/min | 1100, 60 | 1100, 180 | 1100, 180 | 1100, 180 | 1100, 180 | 1100, 180 | 1100, 180 |
| Main crystal phase RT-XRD | low-quartz solid solution | low-quartz solid solution | low-quartz solid solution | low-quartz solid solution | low-quartz solid solution | low-quartz solid solution | low-quartz solid solution |
| Further crystal phases | t-ZrO$_2$, MgAl$_2$O$_4$ | t-ZrO$_2$, MgAl$_2$O$_4$ | t-ZrO$_2$, Mg/ZnAl$_2$O$_4$ Sapphirine, Cristobalite, Mullite | t-ZrO$_2$, Mg/ZnAl$_2$O$_4$ (Spinel/Gahnite solid solution) | t-ZrO$_2$, MgAl$_2$O$_4$ (Spinel/Gahnite solid solution) Cristobalite | t-ZrO$_2$, MgAl$_2$O$_4$, Sapphirine | t-ZrO$_2$, MgAl$_2$O$_4$ |
| CR value | 85.3 | 86.8 | 76.9 | 67.4 | 72.2 | 90.7 | 86.7 |
| Vickers hardness/GPa | — | — | — | — | — | — | — |
| $K_{IC}$/MPa m$^{1/2}$ | — | — | — | — | — | — | — |
| $\sigma_B$/MPa (processed after crystallization) | 227 | — | — | — | — | — | — |
| $\sigma_B$/MPa (processed before crystallization) | — | — | 772 | — | — | — | — |

The invention claimed is:

1. Process for preparing a dental restoration comprising forming a glass ceramic, which comprises a quartz solid solution phase and comprises the following components

| Component | wt.-% |
|---|---|
| SiO$_2$ | 37.0 to 50.0 |
| Al$_2$O$_3$ | 25.0 to 39.0 |
| MgO | 5.0 to 15.0 |
| ZrO$_2$ | 13.5 to 19.0, | into a dental restoration.

2. Process according to claim 1, wherein the glass ceramic comprises 38.0 to 49.0 wt.-% SiO$_2$.

3. Process according to claim 1, wherein the glass ceramic comprises 26.0 to 38.0 wt.-% Al$_2$O$_3$.

4. Process according to claim 1, wherein the glass ceramic comprises 6.0 to 14.0 wt.-% MgO.

5. Process according to claim 1, wherein the glass ceramic comprises 14.0 to 18.0 wt.-% ZrO$_2$.

6. Process according to claim 1, wherein the glass ceramic comprises at least one of the additional following components:

| Component | wt.-% |
|---|---|
| Li$_2$O | 0 to 1.0 |
| Na$_2$O | 0 to 1.0 |
| K$_2$O | 0 to 1.0 |

| Component | wt.-% |
| --- | --- |
| CaO | 0 to 2.5 |
| SrO | 0 to 4.0 |
| ZnO | 0 to 15.0 |
| B$_2$O$_3$ | 0 to 1.0. |

7. Process according to claim 1, wherein the glass ceramic comprises the quartz solid solution phase as main crystal phase.

8. Process according to claim 1, wherein the glass ceramic comprises a high-quartz solid solution phase, a low-quartz solid solution phase or a mixture thereof.

9. Process according to claim 8, wherein the glass ceramic comprises the high-quartz solid solution phase in a higher amount than the low-quartz solid solution phase.

10. Process according to claim 8, wherein the glass ceramic comprises the high-quartz solid solution phase as main crystal phase.

11. Process according to claim 8, wherein the glass ceramic comprises the low-quartz solid solution phase in a higher amount than the high-quartz solid solution phase.

12. Process according to claim 8, wherein the glass ceramic comprises the low-quartz solid solution phase as main crystal phase.

13. Process according to claim 1, which comprises zirconium oxide as a crystal phase.

14. Process according to claim 1, wherein the glass ceramic is present in the form of a powder or a blank.

15. Process according to claim 1, wherein the glass ceramic is given, by machining, the shape of the desired dental restoration.

16. Process according to claim 1, wherein the dental restoration is a bridge, inlay, onlay, veneer, abutment, partial crown, crown or facet.

17. Process for preparing a dental restoration comprising forming a starting glass, which comprises the following components

| Component | wt.-% |
| --- | --- |
| SiO$_2$ | 37.0 to 50.0 |
| Al$_2$O$_3$ | 25.0 to 39.0 |
| MgO | 5.0 to 15.0 |
| ZrO$_2$ | 13.5 to 19.0, | into a dental restoration.

18. Process according to claim 17, wherein the starting glass comprises nuclei for the crystallization of a quartz solid solution phase.

19. Process according to claim 17, wherein the starting glass is given, by machining, the shape of the desired dental restoration.

20. Process according to claim 17, wherein the dental restoration is a bridge, inlay, onlay, veneer, abutment, partial crown, crown or facet.

21. Process according to claim 9, wherein the glass ceramic with a higher amount of high-quartz solid solution phase is given the shape of the desired dental restoration by machining.

* * * * *